United States Patent [19] 3,638,582
Beebe [45] Feb. 1, 1972

[54] RESILIENT BEARING MOUNTING

[72] Inventor: Joseph A. Beebe, Columbus, Ohio
[73] Assignee: The Buckeye Steel Castings Company, Columbus, Ohio
[22] Filed: Dec. 3, 1969
[21] Appl. No.: 881,641

[52] U.S. Cl. .......................105/218 R, 105/222, 105/224.1
[51] Int. Cl. ....................B61f 5/30, B61f 5/38, B61f 15/02
[58] Field of Search ......................105/224.1, 218 R, 222

[56] References Cited

UNITED STATES PATENTS

| 2,229,429 | 1/1941 | Travilla, Jr. | 105/222 |
| 2,215,182 | 9/1940 | Latshaw | 105/224.1 |
| 3,381,629 | 3/1968 | Jones | 105/224.1 X |

Primary Examiner—Drayton E. Hoffman
Assistant Examiner—Howard Beltran
Attorney—Clelle W. Upchurch

[57] ABSTRACT

An elastomeric pad positioned between the bearing assembly and the load bearing portion of a railway truck side frame. The pad is deformed when the truck negotiates a curve to accommodate a nonparallel condition of the axles and thereby avoid slippage between the wheels with respect to the rails. The elastomeric element is stressed during such displacement of a truck axle and this energy serves to restore the axle to a position at right angles to the track when the truck proceeds onto a track section which is tangent to the curve.

2 Claims, 3 Drawing Figures

PATENTED FEB 1 1972 3,638,582

INVENTOR
JOSEPH A. BEEBE

BY
ATTORNEY

RESILIENT BEARING MOUNTING

The present invention relates to trucks for railway vehicles and more particularly pertains to an assembly which includes a resilient element or pad associated with each bearing assembly which serves to accommodate movement between the bearing assemblies and the truck frame to allow a nonparallel relationship of the axles of the truck to develop so that each axle may assume a position coincident with the radius of the curvature in the track over which the vehicle moves.

In a conventional railway car truck of the four-wheel type it is not possible for the truck to move on curved railway rails without slippage between the treads of the wheel and the rails. The geometry of the truck is such that the axles are constrained by the bearings and the side frames to remain substantially parallel to each other under all conditions of operation. If there are small differences in the dimensions of the side frames or if there is movement between the bearing assembly and the pedestal, the axles of the truck may attain a nonparallel relationship and friction forces between the bearing adapter and the pedestal tend to maintain such a nonparallel condition and continuous slippage occurs during movement of the truck on straight track sections. Any such deviations from true rolling movement accentuates wear on the track and truck wheels.

It is an object of the present invention to provide an elastomeric element or pad between the load bearing portion of the side frame of a railway truck and the bearing adapter with the pad so mounted that it is stressed in shear when the truck negotiates a curved track whereby the resilient pad accommodates a nonparallel relationship of the axles of the truck so that they assume positions which are coincident with the radii of the curve being negotiated and thereby virtually eliminating sliding of the wheel on the track.

Another object of the invention is to provide structure in association with the bearing adapter and the resilient pad which makes possible some misalignment of the axles when the railway truck negotiates a curve and with the stress set up in the elastomeric pad being in such a direction as to provide a force tending to return the journals and the axles to a parallel relationship when the truck passes beyond the curve onto a tangent section of the track.

Other objects and features of the invention will be appreciated and become apparent particularly to those skilled in the art pertaining to railway car trucks as the present disclosure proceeds and upon consideration of the following detailed description taken in conjunction with the accompanying drawing wherein an embodiment of the invention is disclosed.

Figure 1:
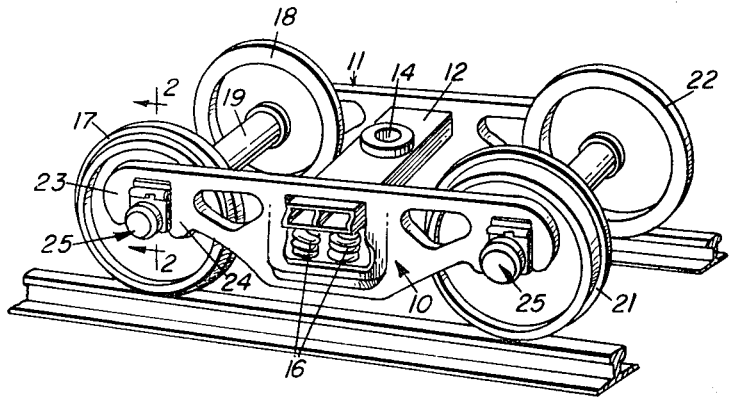
FIG. 1 is a perspective view of a truck for a railway vehicle embodying the invention.

The invention is directed to an assembly wherein an elastomeric element or pad is arranged between each bearing assembly and the frame of a railway truck. In the embodiment shown in the drawing the invention is embodied in a four-wheel truck as shown in FIG. 1. A typical four-wheel truck includes side frames 10 and 11 and a bolster 12 which extends between and connects the side frames. The load of the railway vehicle is imposed on the bolster center plate 14 by a body bolster (not shown) and applied to the side frames through springs 16 in a conventional manner. One set of wheels 17 and 18 are rigidly mounted on an axle 19 and the other set of wheels 21 and 22 are similarly joined by an axle. The side frames 10 and 11 are of a truss type and have pedestal jaws 23 and 24 which accommodate a bearing assembly 25 therebetween.

Figure 2:
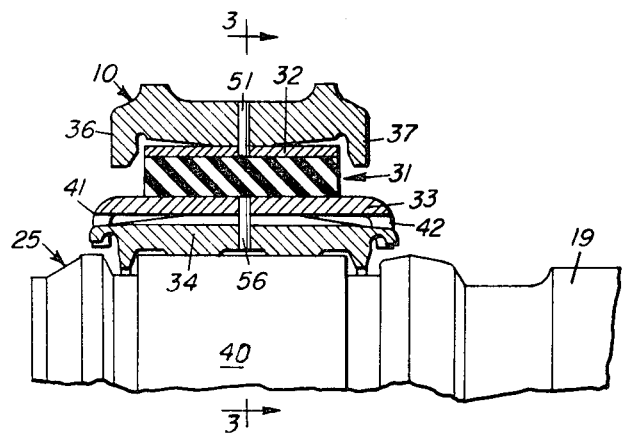
FIG. 2 is a fragmentary sectional view taken on the line 2—2 of FIG. 1.
Figure 3:
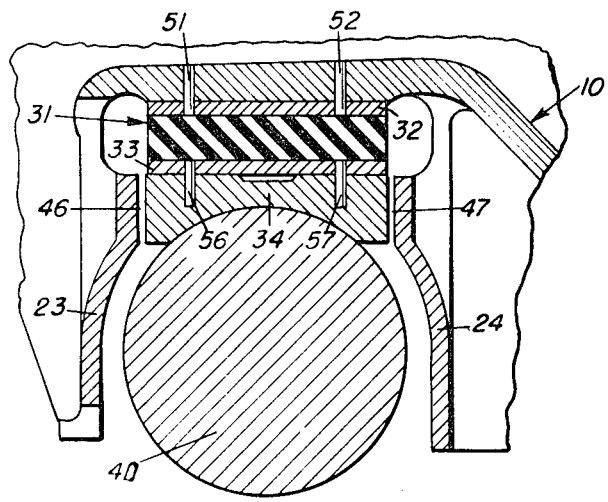
FIG. 3 is a sectional view taken on line 3—3 of FIG. 2.

In carrying out the invention, a resilient element or pad 31 is provided between each bearing assembly 25 and the side frame where it extends over the associated pedestal jaws. The pad 31 is formed of resilient material such as rubber or synthetic rubber or any suitable plastic material having resilient characteristics. The element 31 may be of parallelepiped shape and is bonded to the underside of a top plate 32 and also bonded to the upper face of a bottom plate member 33. The bonding may be carried out in a vulcanizing process or in any suitable manner. The resilient element 31 is arranged between an adapter element 34 and the side frame as shown in FIGS. 2 and 3. The side frame 10 over the pedestal jaws may be provided with ribs 36 and 37 as shown in FIG. 2 which depend along the sides of the pad unit 31.

The adapter element 34 fits over the bearing housing 40 and the plate member 33 rests on the slightly convex upper surface of the adapter element 34. The plate member 33 is provided with depending flanges 41 and 42 as shown in FIG. 2. These flanges depend along the end surfaces of the adapter element 34 and serve to prevent lateral movements of the lower portion of the resilient unit with respect to the adapter element 34.

A feature of the assembly includes the provision of clearance between opposite sides of the adapter element 34 and the pedestal jaws 23 and 24. This clearance is indicated at 46 and 47 and allows fore and aft movement of the adapter element 34 and the bearing housing 40 and thereby permits the axles of the truck to attain a nonparallel relationship.

The elastomeric pad unit 31 is retained in center position in relation to the side frame in the undistorted state by any suitable means. In the embodiment shown in the drawing, two pins 51 and 52 are press fitted in openings in the portion of the side frame over the pedestal jaws. These pins maintain the plate 32 in position preventing lateral and fore or aft movement of the top plate relative to the side frame. Two pins 56 and 57 are press fitted in the adapter element 34 and extend into openings in the bottom plate member 33. These pins 56 and 57 provide means preventing fore and aft and lateral movements of the bottom plate member 33 relative to the adapter element 34. Other means such as lugs may be employed for holding the pad unit in the centered position.

With such a pad unit over each bearing assembly and when the truck enters a curved track the tread of the wheels resulting from the unequal wheel diameter presented to the rails by inner and outer conical tread of the wheels will be sufficient to overcome the centering force provided by the resilient characteristics of the pad unit 31. The axles will accordingly align themselves coincident with the radii of the track curvature. As the railway truck leaves the curve portion of the track and enters a track section which is tangential to the curve portion, the stresses which were set up in the elastomeric pad unit 31 serve as a restoring force which returns the axles to the parallel arrangement at right angles to straight track section. Slippage of the wheels and their flanges and the consequent scrubbing and attrition action is thereby minimized or substantially eliminated.

While the invention has been described with reference to one overall assembly and with respect to one general organization of a railway truck, it will be appreciated that changes may be made in the elements as well as the overall combination. Such modifications and others may be made without departing from the spirit and scope of the invention.

What is claimed and desired to be secured by Letters Patent is:

1. In a truck for a railway vehicle, a set of wheels and an axle rigidly joining said wheels, a bearing assembly at each end of said axle, a side frame having pedestal jaws accommodating therebetween one of said bearing assemblies, a side frame having pedestal jaws accommodating the other bearing assembly therebetween, an adapter element overlying and engaging each bearing assembly, a downwardly facing surface on each side frame above the associated adapter element, an upper plate under and engaging each downwardly facing surface, a resilient pad under each upper plate secured to the underside of the associated upper plate, a bottom plate member overlying and engaging each adapter element having its upper face secured to the associated pad, said pedestal jaws being spaced form the adapter element and the bearing assembly to accommodate fore and aft movements thereof, and means for returning the bearing assembly to its initial position after fore or aft movement which combines the means carried by said adapter element extending into interengaging relationship with said bottom plate member whereby said lower plate and the lower portion of said resilient pad move fore and aft with the adapter element and the bearing assembly with respect to the pedestal jaws, with a means rigidly securing said upper plate to the side frame.

2. The truck for a railway vehicle of claim 1 wherein the said means carried by the adapter element and the means for securing the upper plate to the side frame comprise pins anchored in the adapter element and the side frame.

* * * * *